March 7, 1967

J. R. HARNISH 3,307,368

HEAT PUMPS

Filed Jan. 3, 1966

INVENTOR:
JAMES R. HARNISH,
BY Robert T. Palmer
ATTORNEY

March 7, 1967  J. R. HARNISH  3,307,368
HEAT PUMPS
Filed Jan. 3, 1966  3 Sheets-Sheet 2

INVENTOR:
JAMES R. HARNISH,
BY Robert T. Palmer
ATTORNEY

March 7, 1967  J. R. HARNISH  3,307,368
HEAT PUMPS
Filed Jan. 3, 1966  3 Sheets-Sheet 3
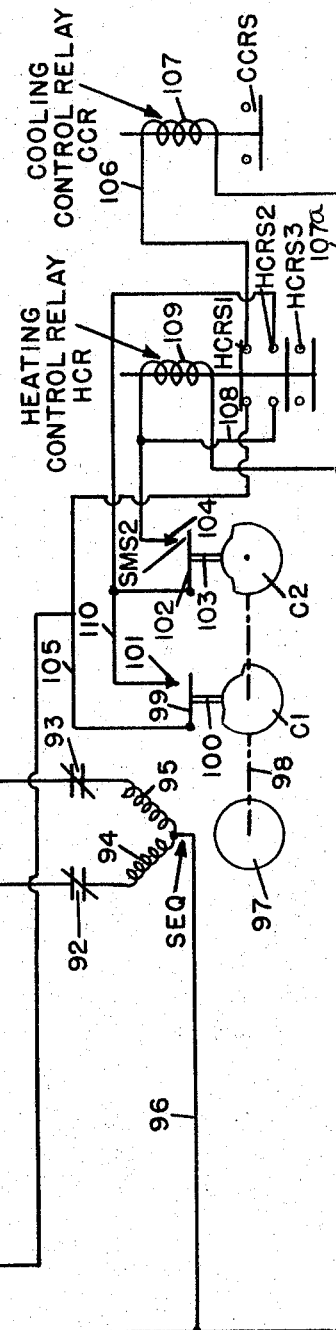
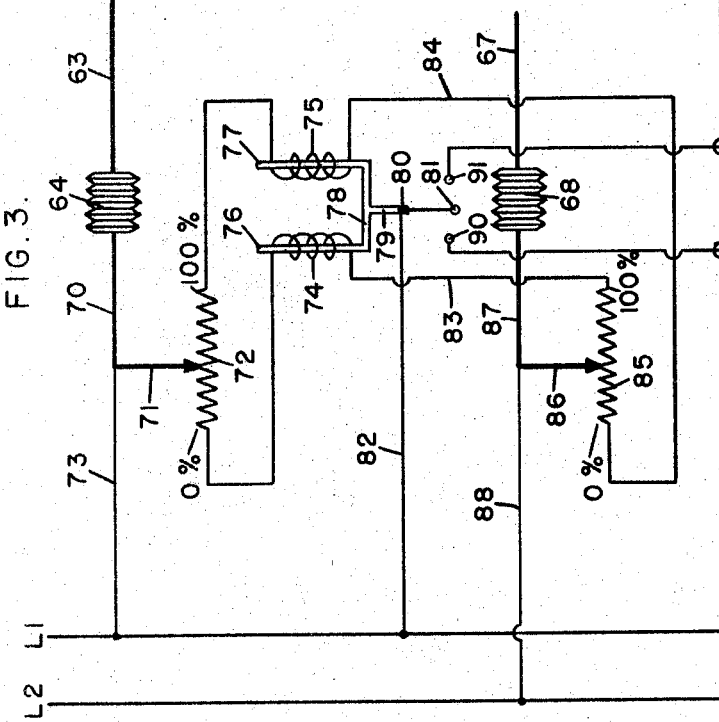
INVENTOR:
JAMES R. HARNISH,
BY Robert J. Palmer
ATTORNEY United States Patent Office 3,307,368
Patented Mar. 7, 1967

3,307,368
HEAT PUMPS
James R. Harnish, Staunton, Va., assignor to Westinghouse Electric Corporation, Pittsburgh, Pa., a corporation of Pennsylvania
Filed Jan. 3, 1966, Ser. No. 518,075
20 Claims. (Cl. 62—160)

This invention relates to heat pumps which are used to cool air in parts of buildings, and simultanteously to heat air in other parts of the same buildings.

A heat pump used for cooling and simultaneously heating indoor air usually has an indoor heat exchanger which operates as a condenser; usually has another indoor heat exchanger which operates as an evaporator, and usually has an outdoor heat exchanger which operates as an additional condenser when the cooling load is greater than the heating load, and which operates as an additional evaporator when the heating load is greater than the cooling load. Some heat pumps of this type have required motor-driven pumps for circulating the refrigerant liquid.

A feature of this invention is that no liquid pump is used, the circulation of liquid being accomplished by the use of an expansion valve which meters highly subcooled refrigerant liquid to the evaporator means at the rate at which it is condensed in the condenser means, providing an excess liquid flow rate to the evaporator means.

Another feature of this invention is that when the cooling load is greater than the heating load, all of the heat is dissipated by the outdoor heat exchanger except when the heating load requires additional heat. This provides more efficient cooling operation.

Another feature of this invention is that when the heating load is greater than the cooling load, a thermal expansion valve is used to meter refrigerant to the indoor heat exchanger operating as an evaporator so that two evaporators, at different temperature levels, can operate in parallel while the condenser means is adequately drained.

Another feature of this invention is that when the outdoor heat exchanger requires defrosting, not only is it operated as a condenser as is usual, but the indoor heat exchanger which normally operates as a condenser, is operated as an evaporator for absorbing heat which is supplied through the refrigeration circuit to the outdoor heat exchanger for aiding in the melting of the frost.

Among the objects of this invention are to simplify; to reduce the costs of, and to improve the performances of heat pumps used for simultaneous cooling and heating.

This invention will now be described with reference to the annexed drawings, of which:

FIG. 1 is a diagrammatic view of a heat pump embodying this invention;

FIG. 3 is an electric circuit schematic showing the components used for determining when the cooling load of the heat pump is greater than its heating load, and vice versa, and for controlling the heat pump accordingly;

FIG. 4 is an enlarged view, in section, of the sub-cooling control valve used as the main expansion valve of the heat pump.

Figure 2A:
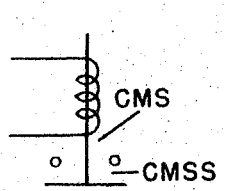
FIGS. 2a, 2b and 2c are diagrammatic views of a compressor motor starter, a fan motor starter, and a defrost relay respectively, used with the heat pump of FIG. 1.

Referring first to FIG. 1, a hermetic compressor C, driven by an electric motor CM, is connected by discharge gas line 10 to a conventional reversal valve RV which is adjusted by a solenoid RVS. The valve RV is connected by line 11 to a water-cooled condenser 12 which is connected by line 13 containing an automatic expansion valve 14 to the outlet of heat exchange coil 16 within accumulator 17. The valve RV is also connected by line 19 to the top of the accumulator 17, and by line 20 to outdoor heat exchanger 22 which operates as a heat sink or heat source depending on the load condition. The coil 22 is connected by lines 23 and 24 to the inlet of the coil 16. The line 24 contains a check-valve 25. Line 15 is connected to the outlet of the coil 16, and is connected through subcooling control valve 28 to line 29 which connects through check-valve 33 to the line 23. The line 13 between the valve 14 and the condenser 12 is connected by line 26 containing a check-valve 27, to the line 24 between the check-valve 25 and the coil 16. The line 19 is connected through a conventional pressure regulator valve 37 to line 38 which is connected to water-chilling evaporator 40. The evaporator 40 is connected by line 41 containing a thermal expansion valve 42, to the line 24 between the check-valve 25 and the coil 16. The line 29 between the valves 28 and 33 is connected by a line 30 containing a check-valve 31, to the line 41 between the valve 42 and the evaporator 40. The accumulator 17 is connected by suction gas line 32 to the suction side of the compressor C.

The automatic expansion valve 14 has a diaphragm chamber 34 connected by an external equalizer line 43 to the line 11. The pressure regulator valve 37 has a diaphragm chamber 44 connected by capillary line 45 to the line 38. The thermal expansion valve 42 has a diaphragm chamber 46 connected by capillary line 43 to thermal bulb 47a in heat exchange contact with the line 38.

The subcooling control valve 28, shown in detail by FIG. 4, is the main expansion valve. It has a diaphragm chamber 48 across the center of which extends a diaphragm 49. The valve 28 has a valve chamber 50 below the diaphragm chamber 48, with a partition 51 extending across its interior between its inlet and outlet. The partition 51 has a valve opening 52. The top of a piston rod 53 is attached to the center of the diaphragm 49, and its bottom is attached to a valve piston 54 above the opening 52. A coiled spring 54a extends around the rod 53 between the bottom of the diaphragm chamber 48 and the top of the piston 54, and biases the latter towards the opening 52. The diaphragm chamber 48 above the diaphragm 49 is connected by a capillary line 55 to a thermal bulb 56 in heat exchange contact with the line 24. The diaphragm chamber 48 below the diaphragm 49 is connected by a capillary line 57 to the interior of the line 24. An increase in the temperature of the high pressure liquid flowing through the line 24 into the coil 16, tends to adjust the valve 28 towards closed position, while an increase in the pressure of the same liquid tends to adjust the valve 28 towards open position. For an increase in the rate at which refrigerant is condensed, if the valve 28 is not sufficiently open, liquid will back up in the heat exchanger which is operating as a condenser until the pressure is increased sufficiently or the temperature is reduced sufficiently to cause the valve 28 to open further. When the condensing rate changes, the valve 28 readjusts accordingly as do all modulating expansion valves, but it meters refrigerant at the rate at which the refrigerant is condensed as does a conventional pilot operated expansion valve controlled by a pilot high pressure float. However, the valve 28 maintains a predetermined amount of subcooling of the condensed refrigerant, which may, for example, be 10° F. subcooling at a condensing temperature of 100° F., and is preferred for this reason.

The condenser 12 has a water inlet tube 60, and a water outlet tube 61 for connection to local air heaters which are not shown. The tube 61 contains a conventional thermostat T3 having a normally closed switch TS3, and contains a conventional thermostat T1 having a thermal bulb which is not shown, and which is connected by line 63 to bellows 64.

The evaporator 40 has a water inlet tube 65, and a water outlet tube 66 for connection to local air coolers which are not shown. The tube 66 contains a conventional thermostat T2 having a thermal bulb which is not shown, and which is connected by line 67 to a bellows 68.

A fan F, driven by an electric motor FM, moves outdoor air over the heat exchanger 22. When the latter is operating as an evaporator at low outdoor temperatures, frost may form on its surface. A conventional defrost control DC responds to a pressure drop in the air passing over the heat exchanger 22 caused by the formation of frost, and has a normally open switch DCS which closes when an appreciable amount of frost has formed. A conventional defrost limiting control DLC is responsive to refrigerant pressure within the heat exchanger 22, and has a normally closed switch DLCS which opens when the pressure within the heat exchanger 22 increases as a result of frost having melted from it when it is operating as a condenser.

Figure 2B:
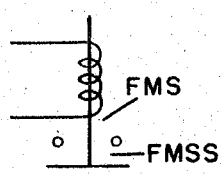
Figure 2C:
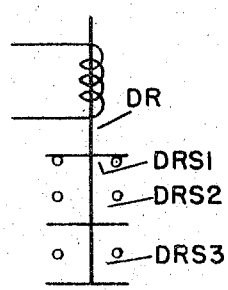

Referring now to FIGS. 2a, 2b and 2c, compressor motor starter CMS has a normally open switch CMSS which closes when the starter CMS is energized; fan motor starter FMS has a normally open switch FMSS which closes when the starter FMS is energized, and defrost relay DR has a normally closed switch DRS1 which opens, and has normally open switches DRS2 and DRS3 which close when the relay DR is energized.

Figure 5:
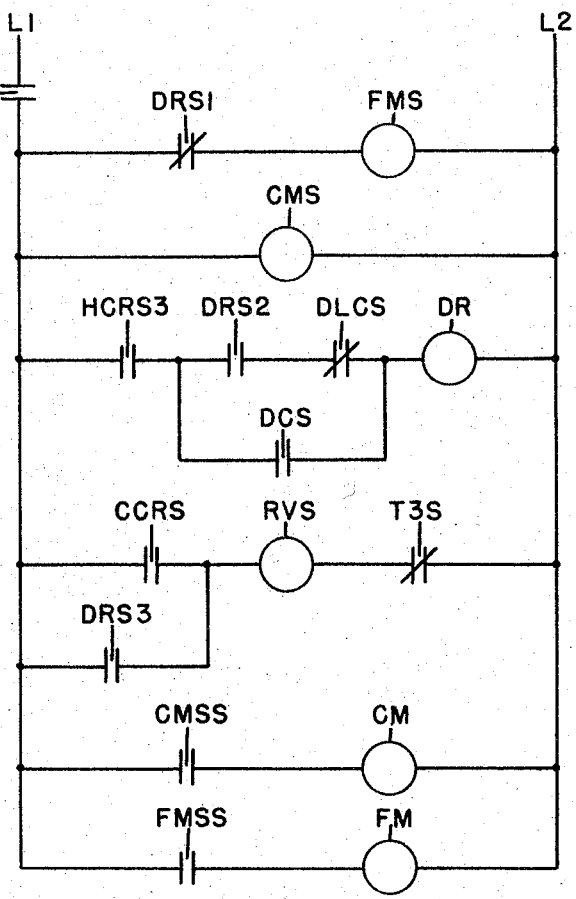
FIG. 5 is a simplified electric circuit schematic showing how the electrical components of th eheat pump other than those shown by FIG. 3, are electrically connected.

Referring now to FIG. 3, the bellows 64 is mechanically connected by rod 70 to slider 71 of potentiometer 72, which is electrically connected by wire 73 to electric supply line L1. The ends of the potentiometer 72 are connected to the upper ends of windings 74 and 75 on legs 76 and 77 respectively, of a U-shaped, magnetic core 78 which has a lower extension 79 which is pivoted at 80, and which is mechanically connected to movable contact 81, the latter being connected by wire 82 to the supply line L1. The lower ends of the windings 74 and 75 are connected by wires 83 and 84 respectively, to the ends of potentiometer 85. Slider 86 of the potentiometer 85 is connected by rod 87 to the bellows 68, and is electrically connected by wire 88 to electric supply line L2. The movable contact 81 is located between fixed contacts 90 and 91 which are connected through limit switches 92 and 93 respectively, to the forward and reverse windings 94 and 95 respectively, of a conventional sequencer SEQ. The windings 94 and 95 are connected together at their lower ends, and by wire 96 to the supply line L2. The sequencer SEQ has a rotor 97 connected by a rotary shaft 98 to cam discs C1 and C2. The free end of a pivoted switch blade 99 is movable by a cam follower 100 of the cam disc C1, towards and from a fixd contact 101. The free end of a pivoted switch blade 102 is movable by a cam follower 103 of the cam disc C2 towards and from a fixed contact 104. The switch blade 99 is connected by wire 105 to switch HCRS1 of heating control relay HCR, and to the line L1. The switch HCRS1 is connected by wire 106 to one end of winding 107 of cooling control relay CCR, the other end of which is connected by wire 107a to the supply line L2. The contact 101 is connected by wire 110 to the switch blade 102 and to switch HCRS2 of the relay HCR, which is connected by wire 108 to one end of winding 109 of the relay HCR, and to the contact 104. The other end of the winding 109 is connected to the supply line L2. The relay CCR has a normally open switch CCRS connected as shown by FIG. 5, in the energizing circuit of the reversal valve solenoid RVS. The relay HCR has a normally open switch HCRS3, connected as shown by FIG. 5, in the energizing circuit of the defrost relay DR.

Referring now to FIG. 5, the electrical control system is connected through a conventional starter switch SS which may be thermostatically controlled, to the supply line L1. The compressor motor starter CMS is connected to the line L2 and through the switch SS to the line L1. The fan motor starter FMS is connected through the switch DRS1 of the defrost relay DR and the switch SS to the supply lines L1 and L2. The defrost relay DR is connected in series with the switch HCRS3 of the heating control relay HCR, the switch DRS2 of the defrost relay DR, the switch DLCS of the defrost limit control and the switch SS to the lines L1 and L2. The series-connected switches DRS2 and DLCS are shunted by the switch DCS of the defrost control DC. The reversal valve solenoid RVS is connected in series with the switch CCRS of the cooling control relay CCR, the switch TS3 of the thermostat T3 and the switch SS to the lines L1 and L2. The switch CCRS is shunted by the switch DRS3 of the defrost relay DR. The compressor motor CM is connected in series with the switch CMSS of the starter CMS and the switch SS to the supply lines L1 and L2. The fan motor FM is connected in series with the switch FMSS of the starter FMS and the switch SS to the lines L1 and L2.

The reversal valve RV, when its solenoid RVS is de-energized, is in one position to route refrigerant as shown by the dashed-line arrows alongside the refrigerant flow lines of FIG. 1, with the outdoor heat exchanger 22 operated as an evaporator, and when its solenoid RVS is energized, is in its other position to route refrigerant as shown by the solid-line arrows alongside the refrigerant flow lines of FIG. 1, with the outdoor heat exchanger 22 operated as a condenser.

*Operation*

When the cooling load is greater than the heating load, the cooling control thermostat T2 moves through the bellows 68, the slider 86 of the potentiometer 85 nearer the 100% point than the heating control thermostat T1 moves through the bellows 64, the slider 71 of the potentiometer 72. This causes more current to flow through the winding 74 than flows through the winding 75, causing the pivoted core 78 to move the contact 81 against the contact 90, supplying current to the field winding 94, causing the rotor 97 to rotate in a counterclockwise direction with reference to FIG. 3, and to rotate the cam discs C1 and C2 in the same direction. The cam follower 103 moves the switch blade 102 away from the contact 104, opening the circuit in parallel with the holding circuit of the switch blade 99. After a time interval, the cam follower 100 moves the switch blade 99 away from the contact 101, opening the circuit of the coil 109. The switch HCRS1 closes and energizes the coil 107. The relay CCR is energized and closes its switch CCRS. The latter energizes through the closed switch TS3 of the thermostat T3, the reversal valve solenoid RVS which adjusts the reversal valve RV to operate the outdoor heat exchanger 22 as a condenser. The compressor C supplies discharge gas through the line 10, the valve RV and the line 20 to the heat exchanger 22. Liquid from the latter flows through the lines 23 and 24, the check-valve 25, the coil 16 within the accumulator 17, the line 15, the subcooling control valve 28, the lines 29 and 30, the check-valve 31 and the line 41 into the evaporator 40. The valve 28 overfeeds the evaporator 40 so that unevaporated refrigerant liquid and gas flow from the evaporator 40 through the line 38 and the pressure regulator valve 37 into the accumulator 17. Gas separated from the liquid within the accumulator 17 flows through the suction gas line 32 to the suction side of the compressor C. Heat from the high pressure liquid flowing through the coil 16 within the accumulator 17, evaporates the refrigerant liquid flowing from the evaporator 40 into the accumulator 17, thus preventing refrigerant liquid from entering the compressor C, the high pressure liquid being further subcooled by this action.

The refrigerant evaporated within the evaporator 40 chills the water circulated therethrough. Water within the condenser 12 will have been heated during a previous operation when the latter was operating as a condenser, and there may be sufficient heat to satisfy the heating requirements. If not, the switch T3S of the thermostat T3 opens, deenergizing the reversal valve solenoid RVS which adjusts the reversal valve RV to route refrigerant as shown by the dashed-line arrows alongside the refrigerant flow lines of FIG. 1. Discharge gas from the compressor C flows through the line 10, the valve RV and the line 11 into the condenser 12. Refrigerant liquid flows from the latter through the line 26, the check-valve 27, the line 24, the coil 16 within the accumulator 17 and the line 15 to the subcooling control valve 28. Liquid flows from the valve 28 through the lines 29 and 23 and the check-valve 33 into the outdoor heat exchanger 22 operating as an evaporator and which may absorb heat from the outdoor air, and through the line 30 and the check-valve 31 into the evaporator 40. During cold weather, the valve 28 will tend to flow all of the refrigerant liquid to the outdoor heat exchanger 22 since the latter is at a lower pressure than the evaporator 40. Therefore, the thermal expansion valve 42 is provided. It responds to superheat in the gas leaving the evaporator 40, and opens to supply sufficient liquid to the evaporator 40 to prevent the latter from becoming starved. The check-valve 31 prevents flow from the valve 42 into the line 29. Gas and unevaporated liquid flow from the heat exchanger 22 through the line 20, the valve RV and the line 19 into the accumulator 17. Gas from the evaporator 40 flows through the line 38 and the pressure regulator valve 37 into the accumulator 17. Gas separated from the liquid within the accumulator 17 flows through the suction gas line 32 to the suction side of the compressor.

The pressure regulator valve 37 prevents the evaporator pressure from falling below that which would result in freezing the water within the evaporator 40. On a cold day when the refrigerant temperature at the outdoor heat exchanger 22 may be −10° F., the valve 37 will throttle the flow of refrigerant through the evaporator 40 until the temperature within the latter is about 35° F.

When the heating load is greater than the cooling load, the heating control thermostat T1 moves, through the bellows 64, the slider 71 of the potentiometer 72 nearer the 100% point than the cooling control thermostat T2 moves, through the bellows 68, the slider 86 of the potentiometer 85. This causes more current to flow through the winding 75 than flows through the winding 74, causing the core 78 to move the contact 81 against the contact 91, supplying current to the field winding 95 of the sequencer SEQ, causing the rotor to rotate in a clockwise direction and to rotate the cam discs C1 and C2 in the same direction. The cam follower 100 moves the switch blade 99 against the contact 101, and the cam follower 103 moves the switch blade 102 against the contact 104, energizing the heating control relay HCR which opens its switch HCRS1 and closes its switches HCRS2 and HCRS3. The now open switch HCRS1 deenergizes the cooling control relay CCR which opens its switch CCRS. The switch HCRS2 is a holding circuit switch connected across the switch formed by the switch blade 102 and the contact 104, for maintaining the heating control relay HCR energized until the switch formed by the switch blade 99 and the contact 101 opens, providing time delay during change-over. This permits the system to stabilize so as to prevent hunting.

The now open switch CCRS deenergizes the reversal valve solenoid RVS, assuming that the switch T3S has reclosed, and that the solenoid RVS is energized. The reversal valve RV is adjusted to the position in which it routes refrigerant as shown by the dashed-line arrows alongside the refrigerant flow lines of FIG. 1 so that the heat pump operates exactly as described in the foregoing in connection with the opening of the thermostat switch T3S, with discharge gas supplied to the condenser 12, and the outdoor coil 22 operated as an evaporator coil.

When the outdoor coil 22 is operating as an evaporator coil, at low outdoor temperatures frost may form on it. When sufficient frost has formed on the coil 22 to substantially affect its performance, the increased air pressure drop across the coil 22 caused by the frost causes the switch DCS of the defrost control D.C. to close and to energize through the now closed switch HCRS3 of the heating control relay HCR, the defrost relay DR. The latter opens its switch DRS1 and closes its switches DRS2 and DRS3. The now open switch DRS1 deenergizes the fan motor starter FMS which opens its switch FMSS, deenergizing the fan motor FM, and stopping the fan F. The now closed switch DRS2 in series with the closed switch DLCS forms with the switch DLCS, a holding circuit across the switch DCS for maintaining the defrost relay DR energized after the fan F stops and the switch DCS opens as a result of there being no air pressure drop across the coil 22. The now closed switch DRS3 energizes through the closed switch T3S of the thermostat T3, the reversal valve solenoid RVS which adjusts the reversal valve RV back to the position where it routes discharge gas through the outdoor coil 22 for operating the latter as a condenser for melting the frost.

The heat pump operates at this time as described in the foregoing when the cooling load is greater than the heating load, with the condenser 12 receiving no discharge gas from the compressor C. The automatic expansion valve 14 connects through the line 13 the condenser 12 to the high pressure liquid line 15, and sensing the low pressure within the condenser, opens to supply refrigerant liquid into the condenser for operating it momentarily as an evaporator for absorbing heat from the warm water circulated through it. This heat is transmitted through the refrigeration circuit to the outdoor coil 22 for aiding in the melting of the frost. Gas at this time flows from the condenser 12 through the line 11, the valve RV and the line 19 into the accumulator 17.

If there is an internal water cooling load during the defrosting, the thermal expansion valve 42 will open to feed the evaporator 40 which will absorb heat which will be transmitted through the refrigeration circuit to the outdoor coil 22 for aiding in the melting of the frost.

When the frost has melted from the coil 22, the resulting pressure rise within the latter will cause the switch DLCS of the defrost limit control DLC to open, deenergizing the defrost relay DR. The latter opens its switches DRS2 and DRS3 and closes its switch DRS1. The closed switch DRS1 energizes the fan motor starter FMS which energizes the fan motor FM and restarts the fan F. The now open switch DRS2 opens the holding circuit across the switch DCS. The now open switch DRS3 deenergizes the reversal valve solenoid RVS which adjusts the valve RV to route refrigerant as described in the foregoing when the heating load is greater than the cooling load, and as shown by the dashed line arrows of FIG. 1.

What is claimed is,

1. A heat pump comprising a refrigerant compressor; a fluid heating condenser; a fluid cooling evaporator; an outdoor heat exchanger; accumulator means; a heat exchange coil arranged to heat liquid within said accumulator means; a main expansion valve; a thermal expansion valve; a suction gas line connecting said accumulator means to the suction side of said compressor; means when the cooling load on said evaporator is greater than the heating load on said condenser, for causing refrigerant to flow in a first circuit in which discharge gas from said compressor is directed into said exchanger, in which condensed refrigerant from said exchanger is directed through said coil and then through said main expansion valve into said evaporator, and in which gas and unevaporated refrigerant is directed from said evaporator into said accumulator means; means when additional heating is required while said cooling load is greater than said heating load, and when said heating load is greater than said cooling load, for causing said refrigerant to flow in a second circuit in which discharge gas from said compressor is directed into said condenser, in which condensed refrigerant from said condenser is directed into said coil, in which refrigerant from said coil is directed through said main expansion valve into said exchanger and into said evaporator, in which refrigerant from said condenser is directed through said thermal expansion valve into said evaporator when the refrigerant directed through said main expansion valve into said evaporator is insufficient to prevent the latter from becoming starved, in which gas and unevaporated refrigerant is directed from said exchanger and from said evaporator into said accumulator means; means responsive to superheat in the gas leaving said evaporator for adjusting said thermal expansion valve; and means for adjusting said main expansion valve to meter all of the refrigerant which is condensed less that metered by said thermal expansion valve.

2. A heat pump as claimed in claim 1 in which said means for causing said refrigerant to flow in said first circuit includes means for determining when said cooling load is greater than said heating load, and in which said means for causing said refrigerant to flow in said second circuit includes means for determining when additional heating is required while said refrigerant is flowing in said first circuit, and includes means for determining when said heating load is greater than said cooling load.

3. A heat pump as claimed in claim 2 in which said means for determining when additional heating is required responds to the temperature of the fluid heated by said condenser.

4. A heat pump as claimed in claim 3 in which said main expansion valve is a subcooling control valve, and in which said means for adjusting said main expansion valve includes means responsive to the pressure and the temperature of the refrigerant entering said coil.

5. A heat pump as claimed in claim 1 in which said means when additional heat is required responds to the temperature of the fluid heated by said condenser.

6. A heat pump as claimed in claim 5 in which said main expansion valve is a subcooling control valve, and in which said means for adjusting said main expansion valve includes means responsive to the pressure and the temperature of the refrigerant entering said coil.

7. A heat pump as claimed in claim 1 in which said main expansion valve is a subcooling control valve, and in which said means for adjusting said main expansion valve includes means responsive to the pressure and the temperature of the refrigerant entering said coil.

8. A heat pump comprising a refrigerant compressor; a fluid heating condenser; a fluid cooling evapoator; an outdoor heat exchanger; an accumulator means; a heat exchange coil arranged to heat liquid within said accumulator means; a main expansion valve; a thermal expansion valve; refrigerant reversal means; a suction gas line connecting said accumulator means to the suction side of said compressor; a discharge gas line connecting the discharge side of said compressor to said reversal means; a third line connecting said reversal means to one end of said exchanger; a fourth line including first check-valve means connecting the other end of said exchanger to the inlet of said coil; a fifth line connecting one end of said condenser to said reversal means; a sixth line containing second check-valve means connecting said inlet of said coil to the other end of said condenser; a seventh line connecting the outlet of said coil to the inlet of said main expansion valve; an eighth line containing third check-valve means connecting the outlet of said main expansion valve to said fourth line between said first check-valve means and said other end of said exchanger; a ninth line connecting said eighth line between said outlet of said main expansion valve and said third check-valve means to one end of said evaporator, said ninth line containing fourth check-valve means; a tenth line connecting said reversal means to said accumulator means; an eleventh line connecting the other end of said evaporator to said tenth line; a twelfth line containing said thermal expansion valve connecting said inlet of said coil to said one end of said evaporator; means when the cooling load of said evaporator is greater than the heating load of said condenser, for adjusting said reversal means to a first position to direct discharge gas from said compressor through said third line into said exchanger, condensed refrigerant from said exchanger flowing through said fourth line and said first check-valve means to said inlet of said coil, refrigerant from said outlet of said coil flowing through said seventh line, said main expansion valve, said eighth and ninth lines, said fourth check-valve means and said twelfth line into said evaporator, gas and unevaporated refrigerant from said evaporator flowing through said eleventh and tenth lines into said accumulator means; means when additional heating is required while said reversal means is in said first position, and when said heating load is greater than said cooling load, for adjusting said reversal means to a second position to direct discharge gas from said compressor through said fifth line into said condenser, condensed refrigerant from said condenser flowing through said sixth line, said second check-valve means and said fourth line to said inlet of said coil, refrigerant from said outlet of said coil flowing through said seventh line, said main expansion valve, said eighth line, said third check-valve means and said fourth line into said exchanger, and flowing through said main expansion valve, said ninth line, said fourth check-valve means and said twelfth line into said evaporator, and when the refrigerant flowing through said main expansion valve, said ninth line, said fourth check-valve means and said twelfth line into said evaporator is insufficient to prevent the latter from becoming starved, flowing through said twelfth line and said thermal expansion valve into said evaporator, gas and unevaporated refrigerant from said exchanger flowing through said third line, said reversal means and said tenth line into said accumulator means, gas from said evaporator flowing through said eleventh and tenth lines into said accumulator means; means responsive to superheat in the gas leaving said evaporator for adjusting said thermal expansion valve; and means for adjusting said main expansion valve to meter all of the refrigerant which is condensed less that metered by said thermal expansion valve.

9. A heat pump as claimed in claim 8 in which said means for adjusting said reversal means to said first position includes means for determining when said cooling load is greater than said heating load, and in which said means for adjusting said reversal means to said second position includes means for determining when additional heating is required while said reversal means is in said first position, and includes means for determining when said heating load is greater than said cooling load.

10. A heat pump as claimed in claim 9 in which said means for determining when additional heating is required includes means responsive to the temperature of the fluid heated by said condenser.

11. A heat pump as claimed in claim 10 in which said main expansion valve is a subcooling control valve, and in which said means for adjusting said main expansion valve includes means responsive to the pressure and the temperature of the refrigerant at said inlet of said coil.

12. A heat pump as claimed in claim 8 in which a thirteenth line containing an automatic expansion valve is provided for connecting said outlet of said coil to said other end of said condenser.

13. A heat pump as claimed in claim 12 in which said main expansion valve is a subcooling control valve, and in which said means for adjusting said main expansion valve responds to the pressure and the temperature of the refrigerant at said inlet of said coil.

14. A heat pump as claimed in claim 8 in which said main expansion valve is a subcooling control valve, and in which said means for adjusting said main expansion valve responds to the pressure and the temperature of the refrigerant at said inlet of said coil.

15. A heat pump as claimed in claim 8 in which means responsive to the presence of frost on said exchanger when said reversal means is in said second position is provided, in which means including said last mentioned means is provided for adjusting said reversal means to said first position, and in which means including means responsive to a condition caused by the melting of the frost is provided for returning said reversal means to said second position.

16. A heat pump as claimed in claim 15 in which said main expansion valve is a subcooling control valve, and in which said means for adjusting said main expansion valve responds to the pressure and the temperature of the refrigerant at said inlet of said coil.

17. A heat pump as claimed in claim 16 in which a thirteenth line containing an automatic expansion valve is provided for connecting said outlet of said coil to said other end of said condenser.

18. A heat pump as claimed in claim 17 in which said eleventh line contains a pressure regulator valve responsive to the pressure of the refrigerant leaving said evaporator.

19. A heat pump as claimed in claim 8 in which said eleventh line contains a pressure regulator valve responsive to the pressure of the refrigerant leaving said evaporator.

20. A heat pump as claimed in claim 19 in which said main expansion valve is a subcooling control valve, and in which said means for adjusting said main expansion valve responds to the pressure and the temperature of the refrigerant at said inlet of said coil.

References Cited by the Examiner

UNITED STATES PATENTS

| | | | |
|---|---|---|---|
| 2,907,178 | 10/1959 | McNatt | 62—160 |
| 3,015,938 | 1/1962 | Brainard | 62—160 |
| 3,060,698 | 10/1962 | Felter | 62—160 |
| 3,078,689 | 2/1963 | Japhet | 62—324 |
| 3,264,839 | 8/1966 | Harnish | 62—160 |

WILLIAM J. WYE, *Primary Examiner.*